United States Patent

[11] 3,624,075

[72] Inventors Konrad Fitzi
Neuallschwil;
Alfred Sallmann, Bottmingen, both of
Switzerland
[21] Appl. No. 801,801
[22] Filed Feb. 24, 1969
[45] Patented Nov. 30, 1971
[73] Assignee Geigy Chemical Corporation
Ardsley, N.Y.
[32] Priority Feb. 29, 1968
[33] Switzerland
[31] 3055/68

[54] DIBENZAZEPINE ACETIC ACID DERIVATIVES
7 Claims, No Drawings

[52] U.S. Cl. .................................................. 260/239 D,
260/247.1, 260/247.2 R, 260/293.4 D, 260/294 S,
260/326.3, 424/59, 424/244

[51] Int. Cl. .................................................. C07d 41/08,
C07d 87/38, C07d 87/46
[50] Field of Search .......................................... 260/239 D

[56] References Cited
FOREIGN PATENTS
414,643 12/1966 Switzerland .................. 260/239

*Primary Examiner*—Alton D. Rollins
*Attorneys*—Karl F. Jorda and Bruce M. Collins ABSTRACT: Derivatives of 10,11-dihydro-5H-dibenz[b,f]az epine-acetic acids and salts thereof with a base are prepared by various methods; the compounds have anti-inflammatory, analgesic and antipyretic activity and absorb irritating rays of ultraviolet light; they are the active ingredients of pharmaceutical compositions and are useful for treating inflammatory diseases; an illustrative embodiment is 5-methyl-10,11-dihydro-5H-dibenz[b,f]azepine-3-acetic acid.

DIBENZAZEPINE ACETIC ACID DERIVATIVES

DETAILED DESCRIPTION

The present invention concerns substituted 10,11-dihydro-5H-dibenz[b,f]azepine-acetic acids and salts thereof with a base, pharmaceutical compositions containing these compounds and methods of treating inflammatory diseases by administering them.

More in particular, the present invention concerns substituted 10,11-dihydro-5H-dibenz[b,f]azepine-acetic acids of the formula

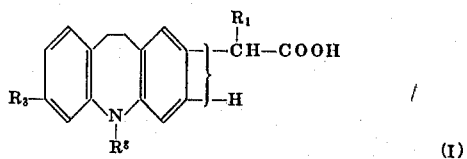

(I)

wherein
the group

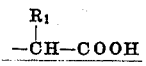

is in 2- or 3-position,
$R_1$ is hydrogen or lower alkyl having at most three carbon atoms,
$R_2$ is hydrogen or lower alkyl having at most four carbon atoms, and
$R_3$ is hydrogen or chloro;
and the pharmaceutically acceptable salts thereof with a base, which compounds have valuable pharmacological properties, in particular anti-inflammatory, antiedematous, analgesic and antipyretic properties. They furthermore absorb irritating rays of ultraviolet light.

In the compounds of formula I and in the various starting materials and intermediates mentioned below, the term lower alkyl having at most three carbon atoms embraces, e.g. the methyl, ethyl and n-propyl group. By lower alkyl having at most four carbon atoms are embraced, e.g. the methyl, ethyl, n-propyl, n-butyl and isobutyl group.

A preferred class of compounds according to the invention are the acids embraced by formula I, wherein the group

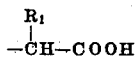

is in 2- or 3-position, $R_1$ is hydrogen or methyl, $R_2$ is hydrogen or methyl and $R_3$ is hydrogen or chloro.

Preferred members of this class of compounds are: 5-methyl-10,11-dihydro-5H-dibenz[b,f]azepine-3-acetic acid, 10,11-dihydro-5H-dibenz[b,f]azepine-2-acetic acid, 5-methyl-10,11-dihydro-5H-dibenz[b,f]azepine-2-acetic acid, α,5-dimethyl-10,11-dihydro-5H-dibenz[b,f]azepine-2-acetic acid, and 7-chloro-5-methyl-10,11-dihydro-5H-dibenz[b,f]azepine-2-acetic acid.

To produce the new compounds of the general formula I and their salts, a compound of the general formula II,

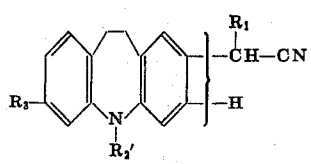

(II)

wherein
$R_2'$ is hydrogen, lower alkyl having at most four carbon atoms, benzyl or lower alkanoyl having at most four carbon atoms, and
$R_1$ and $R_3$ have the meaning given under formula I, is subjected to alcoholysis, the obtained alkyl ester is optionally hydrolized in an alkaline or acid medium and, optionally, the carboxylic acid is liberated from a salt obtained in the former case and/or the obtained carboxylic acid is converted into a salt with an inorganic or organic base.

The alcoholysis of the nitriles of the general formula II is performed, for example, by the simultaneous or successive action of a mineral acid, a lower alkanol and, optionally, water. For example, a nitrile of the general formula II is reacted with a mixture of hydrogen chloride and a lower alkanol in the presence or absence of an additional organic solvent such as, e.g. ether, whereby, by way of the imide chloride, the corresponding imidoalkylester hydrochloride is formed, which can be decomposed with water to give the corresponding lower alkyl ester. Optionally, a benzyl group $R_2'$ can be split off in the course of the alcoholysis.

The hydrolysis of the aforementioned lower alkyl esters to give the corresponding carboxylic acids of the general formula I and/or their salts, is performed, for example, by boiling in an alkanolic aqueous alkali hydroxide solution.

The production of the nitriles of the general formula II, which are required as starting materials, is further dealt with below.

According to the second process, the free carboxylic acids embraced by the general formula I, and their salts, are produced by hydrolyzing, in an alkaline or acid medium, a compound of the general formula III,

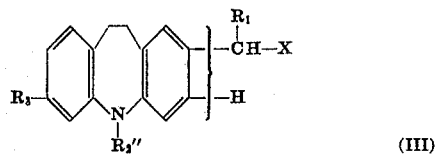

(III)

wherein
X is a group, which can be hydrolyzed to obtain the carboxyl group, especially the cyano group, a carboxylic acid imido ester group, a carboxylic acid ester group or the carbamoyl group, the thiocarbamoyl group, which can be mono- or dialkyl substituted at the nitrogen atom, whereby in the case of disubstitution, the two alkyl groups can be bound by way of an oxygen atom,
$R_2''$ is hydrogen, a lower alkyl group having at most four carbon atoms, a lower alkanoyl group having at most four carbon atoms, and
$R_1$ and $R_3$ have the meaning given under formula I, optionally liberating the carboxylic acid from a salt obtained in the former case, and/or converting the obtained carboxylic acid into a salt with an inorganic or organic base.

For example, a carboxylic acid ester or carboxylic acid imido ester embraced by the general formula III is hydrolyzed by boiling in an alkanolic-aqueous alkali hydroxide solution. The hydrolysis of corresponding nitriles, amides, thioamides or thiomorpholides is carried out, for example, in the same manner or by heating with a mineral acid such as, e.g. concentrated hydrochloric acid, aqueous sulfuric acid or anhydrous phosphoric acid. More energetic conditions are used if, simultaneously with the hydrolysis of the group X, a lower alkanoyl or a benzyl group $R_2''$ is to be split off. The alkaline hydrolysis of a carboxylic acid derivative and simultaneous splitting off of an alkanoyl radical $R_2''$ is performed, for example, with the aid of an alkali hydroxide in a solvent having a higher boiling point and containing hydroxyl groups, such as ethylene glycol, whereas the acid hydrolysis and simultaneous splitting off of a benzoyl group $R_2''$ is performed, e.g. by heating with concentrated hydrobromic acid.

The nitriles embraced by the general formula II or III, are produced in various ways which, in particular, depend on the position of the side chain and on the meaning of $R_1$. From 5-acetyl-3-amino-10,11-dihydro-5H-dibenz[b,f]azepines, optionally substituted according to the definition for $R_3$, are obtained by means of the Sandmeyer reaction the corresponding 5-acetyl-10,11dihydro-5H-dibenz[b,f]azepine-3-carbonitriles. These compounds are converted by means of hydrolysis using alkali hydroxides in ethylene glycol or diethylene glycol at 150°–200° C. into corresponding 10,11-dihydro-5H-dibenz[b,f]azepine-3-carboxylic acids which, optionally, are then alkanoylated in 5-position. The 5-acetyl-10,11-dihydro-5H-dibenz[b,f]azepine-3-carboxylic acids or -2-carboxylic acids and their derivatives substituted according to the definition for $R_3$ can, if desired, also be produced from optionally accordingly substituted 3,5-diacetyl-10,11-dihydro-5H-dibenz[b,f]azepine and 2,5-diacetyl-10,11-dihydro-5H-dibenz[b,f]azepine, respectively, the production of which is described below, by means of oxidation, e.g. using aqueous sodium hypochlorite solution in dioxane. The obtained carboxylic acids are reduced with diborane in an ethereal solvent to corresponding 10,11-dihydro-5H-dibenz[b,f]azepine-3-methanols and -2-methanols respectively, or, with the presence of a 5-alkanoyl group in the starting material, to corresponding 5-alkyl-10,11-dihydro-5H-dibenz[b,f]azepine-3-methanols and -2-methanols respectively. Furthermore, the above-mentioned carboxylic acids can be firstly converted into their methyl esters and the latter reduced with lithium aluminum hydride in an ethereal solvent. 10,11-Dihydro-5H-dibenz[b,f]azepine-2-methanol and its derivatives substituted according to the definition for $R_2''$ and $R_3$, can also be obtained by reduction or hydrogenation of the corresponding 10,11-dihydro-5H-dibenz[b,f]azepine-2-carboxaldehydes, the production of which is described below.

The hydroxy compounds thus obtained in various ways are converted either in the usual manner, e.g. using phosphorus tribromide, phosphorus pentachloride or thionyl chloride, into corresponding bromo or chloro compounds, or they are firstly converted into their alkali metal compounds, which are then reacted with sulfonic acid halides, e.g. with p-toluene sulfonic acid chloride, to give corresponding sulfonic acid esters. The stated bromo, chloro or sulphonyloxy compounds are now reacted with alkali cyanides to give the nitriles which are embraced by the general formula II or III.

Optionally, other functional derivatives of these acids, which can likewise by hydrolyzed, and in some cases more easily so, to give free acids of the general formula I, are produced in the usual manner from the nitriles. The conversion of the nitriles into imidoalkyl ester hydrochlorides and hydrolysis of the latter to give corresponding lower alkyl esters, which are also embraced by the general formula I, has already been mentioned. Amides, covered by the general formula III, are obtained, for example, by the action of hydrogen peroxide on the corresponding nitriles in aqueous acetone or aqueous lower alkanols at temperatures of 40°–60°.

The N-alkylated esters, as starting materials, are obtained by reacting cold, in an ethereal solvent, e.g. a compound of the general formula IIIa,

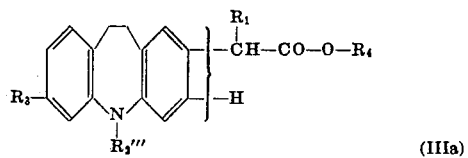

(IIIa)

wherein $R_2'''$ is a lower alkanoyl group having at most four carbon atoms, and $R_4$ is a lower alkyl group having at most four carbon atoms, and $R_1$ and $R_3$ have the meaning given under formula I, with diborane. Suitable as the reaction medium are, e.g. tetrahydrofuran, diethylether, dioxane, methylene glycol dimethylether or diethylene glycol dimethylether. The reaction temperature is preferably between −30° and room temperature. The diborane is formed, e.g. from boron trifluoride etherate and sodium boron hydride either in a separate apparatus and introduced into the reaction mixture, or it is formed in situ.

The $\alpha$-C-alkylated esters, as starting materials, are obtained by reacting a compound of the general formula IIIb

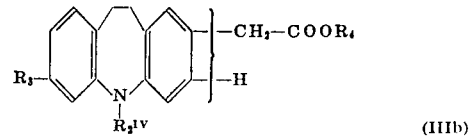

(IIIb)

wherein $R_3$ and $R_4$ have the meaning given under formula IIIa and $R_2^{IV}$ is a lower alkyl group having at most four carbon atoms or a lower alkanoyl group having at most four carbon atoms, in the presence of the essentially equimolar amount of an alkaline condensation agent in a suitable solvent such as, e.g. hexamethyl phosphoric acid triamide or dimethyl formamide, with an essentially equimolar amount of a reactive ester of a hydroxy compound of the general formula IV, $$R_1'—OH \qquad (IV)$$

wherein $R_1'$ has the meaning given under formula I for $R_1$, with the exception of hydrogen. Compounds of the general formula IIIb, wherein $R_2^{IV}$ is a lower alkanoyl group having at most four carbon atoms, are hydrolyzed in an alkaline medium, whereby splitting off of the alkanoyl group occurs.

Thioamides, mono- and disubstituted thioamides and, in particular, thiomorpholides of carboxylic acids of the general formula I, wherein $R_1$ is hydrogen, all corresponding to the general formula III, are produced starting with compounds of the general formula IIIc,

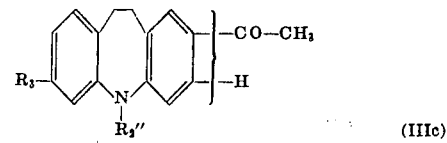

(IIIc)

wherein $R_2''$ is hydrogen, a lower alkyl group with at most four carbon atoms or a lower alkanoyl group having at most four carbon atoms, and $R_3$ has the meaning given under formula I, using the methods of Willgerodt or Willgerodt-Kindler. According to these methods, a compound of the general formula IIIc is heated with ammonium polysulfide, or with ammonia or a primary or secondary amine and sulfur. The reaction of a compound of the general formula IIIc with ammonium polysulfide is, for example, performed in a medium in which one, or preferably both, reactants are at least partially soluble such as, e.g. dioxane, in a closed vessel at temperatures around 160°–220° C. According to Kindler's modification, a compound of the general formula IIIc can, for example, be reacted with aqueous or anhydrous ammonia, or with a lower mono- or dialkylamine or piperidine and with sulfur, likewise in a closed vessel and, optionally, in the presence of pyridine at temperatures of 140°–180° C. According to the most common embodiment of the Kindler modification, morpholine is used as amine, whereby its boiling point of 138° C. renders unnecessary the use of the pressure vessels. For example, the compound of the general formula IIIc and sulfur are refluxed in excess morpholine for some time, e.g. about 5–40 hours. The morpholide of a thioacid, embraced by the general formula III and defined by formula IIId,

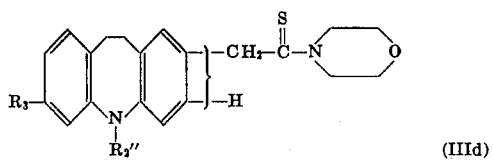

(IIId)

wherein $R_2''$ and $R_3$ have the meaning given under formula III, is likewise hydrolyzed like the thioamides obtained in the case of the other embodiments, e.g. by boiling with alkanolic or alkanolic-aqueous potassium or sodium hydroxide solution. Of the compounds required as starting materials for the Willgerodt reactions and Willgerodt-Kindler reactions, the 3,5-diacetyl-10,11-dihydro-5H-dibenz[b,f]azepine and the 3-acetyl-10,11-dihydro-5H-dibenz[b,f]azepine are known. Analogously to these known compounds, compounds having a substituent $R_3$, as defined, are produced by condensation of correspondingly substituted 5-acetyl-10,11-dihydro-5H-dibenz[b,f]azepines with acetyl chloride according to the Friedel-Crafts reaction and, optionally, subsequent hydrolysis to split off the 5-acetyl group. From the 3-acetyl compounds unsubstituted in 5-position, compounds are obtained with other lower alkanoyl groups or with lower alkyl groups as substituent $R_2''$ by alkanoylation with formic acid/acetic acid anhydride mixtures, or with acetyl chloride, propionyl chloride or butyryl chloride, or by reacting with lower alkyl halides, such as methyl iodide, at increased temperatures, e.g. in methanol solution in a closed vessel.

The compounds of the general formula IIIc substituted in 2-position by the acetyl group, whereby $R_3$ has the meaning given under formula III and $R_2''$ denotes a lower alkyl group having at most four carbon atoms, are produced by reacting a 5-alkyl-10,11-dihydro-5H-dibenz[b,f]azepine with N,N-dimethyl formamide and phosphorus oxychloride using the Vilsmeyer method, to give the correspondingly substituted 5-alkyl-10,11-dihydro-5H-dibenz[b,f]-azepine-2-carboxaldehyde, converting this, in a known manner, into the 5-alkyl-10,11-dihydro-5H-dibenz[b,f]azepine-2-carboxaldoxime. The latter is converted by heating with acetic acid anhydride into the 5-alkyl-10,11-dihydro-5H-dibenz[b,f]azepine-2-carbonitrile, which is converted by means of a Grignard reaction and in a known manner, into the 2-acetyl-5-alkyl-10,11-dihydro-5H-dibenz[b,f]azepine of the general formula IIIc.

According to a third process, compounds of the general formula I, wherein $R_2$ denotes hydrogen, while $R_1$ and $R_3$ have the meaning given under formula II, and salts thereof are produced by hydrolyzing a compound of the general formula V,

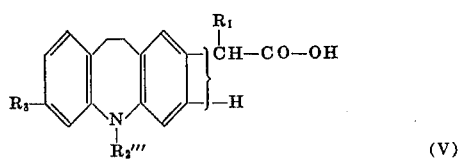

(V)

wherein
$R_2'''$ is a lower alkanoyl group having at most four carbon atoms, and
$R_1$ and $R_3$ have the meaning given under formula I, in an alkaline or acid medium and, optionally, liberating the carboxylic acid from the, optionally, firstly obtained salt and/or converting the free carboxylic acid into a salt with an inorganic or organic base.

The hydrolysis is formed in the usual manner, e.g. by heating the compounds of the general formula V with aqueous-organic or organic alkali hydroxide solutions or with mineral acids. In general however, more energetic reaction conditions are necessary than, e.g. for the hydrolysis of alkyl esters embraced by the general formula III. The hydrolysis is therefore carried out preferably at high temperatures, either in a closed vessel or in a medium having a higher boiling point such as, e.g. ethylene glycol, at the boiling point of the latter. As already mentioned, the hydrolysis of a compound of the general formula III to give the corresponding free acid, or a salt thereof, and the splitting off of a lower alkanoyl group present in 5-position, can also be carried out in the same operation.

The same types of compounds of the general formula I, as obtained using the third-mentioned process, are produced by a related fourth production process, whereby compounds of the general formula VI,

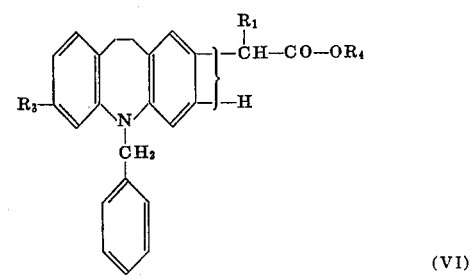

(VI)

wherein
$R_1$ and $R_3$ have the meaning given under formula I, and
$R_4$ is hydrogen, a lower alkyl group or the benzyl group, are reacted in the presence of concentrated solutions of hydrobromic acid at increased temperature, or whereby a compound of the general formula VI, wherein $R_4$ has the above meaning with the exception of the alkyl group, is reacted with catalytically activated hydrogen and, optionally, the obtained carboxylic acid converted into a salt with an inorganic or organic base. For example, a compound of the general formula VI is heated with saturated, aqueous hydrobromic acid at temperatures between about 80° and boiling temperature. The catalytic hydrogenolysis to split off the benzyl radical is performed, for example, in the presence of nobel metal catalysts or Raney-nickel in suitable organic solvents, such as ethanol or dioxane, at normal or moderately increased pressure and likewise temperature. As already mentioned above, the splitting off of the benzyl group by means of hydrobromic acid can also be carried out in the same operation as the acid hydrolysis of a suitable compound of the general formula III.

According to a fifth process, compounds of the general formula I, wherein $R_2$ is different to hydrogen, are produced by reacting a compound of the narrower general formula VII,

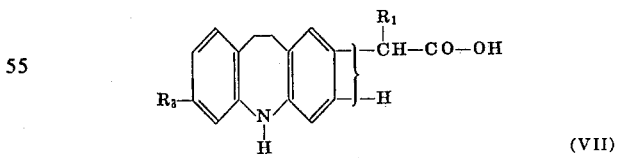

(VII)

which is embraced by the general formula I and whereby, in formula VII, $R_1$ and $R_3$ have the meaning given under formula I, with a reactive ester of a lower alkanol and, optionally, converting an obtained carboxylic acid of the general formula I into a salt with an inorganic or organic base. For example, a compound of the general formula VII is heated in an organic solvent such as, e.g. chloroform, benzene, toluene or methanol, if necessary in a closed vessel, with a lower alkyl halide such as methyl or ethyl iodide, or methyl or ethyl chloride.

According to a sixth process, compounds of the general formula I, wherein $R_1$ represents an alkyl group having at most three carbon atoms, and their salts are obtained by reacting a compound of the general formula VIII,

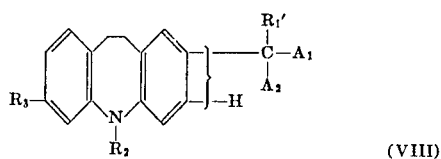

(VIII)

wherein $R_1'$ is an alkyl group having at most three carbon atoms, $A_1$ is a lower alkoxycarbonyl group (—CO—O—alkyl) or the cyano group and $A_2$ is a lower alkoxycarbonyl group, a lower alkoxalyl group (—CO—CO—O—alkyl), the cyano group or the acetyl group, and $R_2$ and $R_3$ have the meaning given under formula I, with an alkali hydroxide in an organic or organic-aqueous medium or, if neither $A_1$ nor $A_2$ is a cyano group, also with an alkali alkanolate in an anhydrous medium or, if $A_2$ is not an acetyl radical, also with a mineral acid in an organic-aqueous medium, liberating the acid, in the case of an alkali hydroxide, from an optionally firstly obtained alkali salt of a dicarboxylic acid and heating the acid until splitting off of equimolar amount of carbon dioxide and optionally carbonmonoxide and, optionally, converting an obtained free monocarboxylic acid into a salt with an inorganic or organic base, or by liberating the monocarboxylic acid, of the general formula I, from an obtained salt thereof.

The reactions with alkali hydroxides, especially sodium or potassium hydroxide, are preferably performed hot. Suitable as a reaction medium are, e.g. a lower alkanol such as methanol, ethanol, isopropanol or n-butanol, also an alkane diol or a monoalkylether thereof, e.g. ethylene glycol, 2-methoxy ethanol or 2-ethoxy ethanol, whereby, optionally, water in the volume ratio of about 10:1 to 1:2 is added to the stated solvents. Moreover, as a reaction medium, it is also possible to use water or, e.g. a mixture of water with water-soluble ethereal solvents, such as dioxane or tetrahydrofuran.

Whereas in the case of the reaction with alkali hydroxides under energetic reaction conditions, e.g. in a boiling mixture of ethylene glycol or n-butanol with a little water, in the aforementioned process, direct salts of monocarboxylic acids of the general formula I are formed: salts of dicarboxylic acids are, optionally, firstly obtained under less energetic conditions, e.g. in the lowest alkanols. From these salts are then liberated, according to the process, the corresponding dicarboxylic acids and the latter are subsequently decomposed to compounds of the general formula I.

Starting materials of the general formula VIII are produced, for example, starting with compounds of the general formula III, wherein X denotes a lower carboxylic acid alkyl ester group (lower alkoxycarbonyl group) or the cyano group, $R_1$ represents hydrogen, $R_2$ represents hydrogen or a lower alkyl group and $R_3$ denotes hydrogen or chlorine. Such like lower alkyl esters, or nitriles, are condensed with lower dialkyl carbonates, lower oxalic acid dialkyl esters or acetic acid alkyl esters with the aid of alkali metal alkanolates in lower alkanols or, for example, also in inert organic solvents such as benzene or toluene, and the alkali metal compounds of the obtained condensation products, to introduce the alkyl group $R_1'$, are reacted with alkyl halides having at most three carbon atoms.

Suitable as salts for therapeutic application are those having pharmacologically acceptable inorganic and organic bases, i.e. bases which exhibit, in the dosages in question, no physiological inherent action or else a desired action, e.g. having, for example, in the case of parenteral forms of administration, in particular a local anesthetic action. Suitable salts are, e.g. sodium, potassium, lithium, magnesium, calcium and ammonia salts, also salts with ethylamine, triethylamine, ethanolamine, diethanolamine, 2-dimethylamino-ethanol, 2-diethylamino-ethanol, ethylene diamine, benzyl amine, procaine, pyrrolidine, piperidine, morpholine, 1-ethyl-piperidine or 2-piperidino-ethanol.

The compounds of the invention have been found to have valuable pharmacological properties. In particular, they have been found to have anti-inflammatory, antiedematous, analgesic and antipyretic activity which is combined with a favorable therapeutic index. The gastrointestinal side effects are of minor nature. The pharmacological activity is determined in various standard pharmacological tests in experimental animals.

As an example of the use of the compounds of the invention as anti-inflammatory agent, the use of 10,11-dihydro-5H-dibenz[b,f]azepine-2-acetic acid in bolus alba induced edema in the rat paw is described. The test used is that described by G. Wilhelmi, Jap. Journ. Pharmac. 15, 190 (1965). The compound under investigation is administered to rats perorally through an asophageal sound in a dosage of about 100 mg./kg. of body weight. One hour thereafter bolus alba edema is induced by subcutaneous injection of 0.1 ml. of a 10 percent suspension of finely sieved bolus alba in tragacanth into the plantar region of the right-hand paw of the rats. Another group of rats having not obtained the 10,11-dihydro-5H-dibenz[b,f]azepine-2-acetic acid, but also the bolus alba, serves as control group. Each group consists of 20 male albino rats weighing about 110 to about 130 g. The intensity of the swelling of the rat's paw is determined 5 hours after the bolus alba injection, by measuring the weight differences of the unswollen left paws and the swollen right paws. Comparing the change of swelling of the test group and the control group indicates that 10,11-dihydro-5H-dibenz[b,f]azepine-2-acetic acid has a significant inhibiting effect on the formation of the bolus alba edema. Administration of from about 5 to 200 mg./kg. perorally of other compounds of the invention, in particular of the preferred members thereof, has a similar inhibiting effect.

The analgesic activity of the compounds of the invention are demonstrated in the "writhing test" in mice. This test is described by E. Siegmund, R. Cadmus and G.In, Proc. Soc. Exp. Biol. Med. 95, 729 (1927). Determined is the amount of test substance preventing in 60 percent of the test animals the syndrome produced by intraperitoneal injection of 2-phenyl-1,4-benzquinone. The $DE_{60}$ of 10,11-dihydro-5H-dibenz[b,f]azepine-2-acetic acid is thus determined to be about 65 mg./kg. on peroral administration. Similar results are obtained with other compounds of the invention.

The toxicity of the compounds of formula I as determined in mice on peroral administration is of favorable low order.

The pharmacological properties of the compounds embraced by formula I are shared by the pharmaceutically acceptable salts thereof. These properties render the compounds of the invention suitable for the oral, rectal or parenteral, in particular intramuscular treatment of rheumatic, arthritic and other inflammatory diseases.

Moreover, the compounds of formula I and their salts are suitable as UV-absorbers for cosmetic purposes, e.g. as constituents of ointments and oils for protection against ultraviolet sunlight. In this case they are used externally.

The daily dosages, to be taken internally, of compounds of the general formula I, or of pharmaceutically acceptable salts of such compounds, for the treatment of rheumatic, arthritic and other inflammatory diseases are between 2–15 mg./kg., preferably 5–10 mg./kg. for adult patients. Suitable dosage units such as dragees, tablets, suppositories or ampoules, preferably contain 10–250 mg. of a compound of the general formula I, or of a pharmaceutically acceptable salt of a carboxylic acid embraced by the general formula I.

Dosage units for oral administration contain as active substance preferably between 10 percent and 90 percent of a compound of the general formula I or of a pharmaceutically acceptable salt of a carboxylic acid embraced by this formula. They are produced by combining the active substances with e.g. solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols having suitable molecular weights, to form tablets or dragée cores. The latter are coated, for example, with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to indicate varying dosages of active substance.

Suitable dosage units for rectal administration are, e.g. suppositories which consist of a combination of a compound of the general formula I, or of a suitable salt of a carboxylic acid embraced by the general formula I, with a neutral fatty foundation, or also gelatine rectal capsules which contain a combination of an active substance, or of a suitable salt thereof, with polyethylene glycols.

Ampoules for parenteral, particularly intramuscular administration, preferably contain a water-soluble salt, e.g. sodium salt, of a carboxylic acid embraced by the general formula I, in a concentration preferably of 0.5 percent to 5 percent in aqueous solution, optionally together with suitable stabilizers and buffer substances.

The following examples will serve to further typify the nature of the present invention, but should not be construed as a limitation on the scope thereof.

EXAMPLE 1

5-Methyl-10,11-dihydro-5H-dibenz[b,f]azepine-3-acetic acid

The solution of 10.0 g. of 5-methyl-10,11-dihydro-5H-dibenz[b,f]-3-acetonitrile in 500 ml. of chloroform and 50 ml. of absolute ethanol is saturated at 0°-5° with hydrogen chloride and then stirred for 14 hours at 20°-25°. The solution is then concentrated by evaporation, the residue is stirred with 100 ml. of dioxane and 20 ml. of water at 40° for 5 hours and again concentrated by evaporation. The crude ethyl ester is refluxed for 1 hour with 100 ml. of ethanol and 30 ml. of 5N sodium hydroxide solution. The ethanol is distilled off and the remaining alkaline solution is acidified with 2N hydrochloric acid. The obtained aqueous suspension is extracted with ethyl acetate and the organic phase is then repeatedly extracted with 2N sodium carbonate solution. The sodium carbonate solutions are combined and acidified with 2N hydrochloric acid. The precipitated pale yellow crystals are filtered by suction and recrystallized from cyclohexane. The 5-methyl-10,11-dihydro-5H-dibenz[b,f]azepine-3-acetic acid, m.p. 140°-141°, is obtained.

1'. 5-n-butyl-10,11-dihydro-5H-dibenz[b,f]azepine-3-acetic acid (oil) is obtained analogously, starting with 7.8 g. of 5-n-butyl-10,11-dihydro-5H-dibenz[b,f]azepine-3-acetonitrile (oil).

The starting materials are produced as follows:
a. 10,11-dihydro-5H-dibenz[b,f]azepine-3-carboxylic acid 16.5 g. of 5-acetyl-10,11-dihydro-5H-dibenz[b,f] azepine-3-carboxylic acid are refluxed in a solution of 15.0 g. of potassium hydroxide in 300 ml. of absolute ethanol for 16 hours. After cooling, the ethanol is completely evaporated in a rotary evaporator and the residue is dissolved in water. The clear aqueous phase is acidified and the precipitated crystals are filtered by suction and recrystallized from absolute ethanol, whereby the 10,11-dihydro-5H-dibenzo[b,f]azepine-3-carboxylic acid is obtained, m.p. 196°-197°.
b. 5-formyl-10,11-dihydro-5H-dibenz[b,f]azepine-3-carboxylic acid 70 ml. of acetic anhydride are mixed at 35°-40° with 35 ml. of formic acid. After 1 hour, 11 g. of 10,11-dihydro-5H-dibenz[b,f]azepine-3-carboxylic acid are introduced into the solution at 45°-50° within 1½ hours. The mixture is then stirred for a further 2½ hours at 45°-50° and for 8 hours at 20°-25. 100 ml. of water are then added dropwise at 40°-50° and, after cooling, the precipitated crystals are filtered by suction. The 5-formyl-10,11-dihydro-5H-dibenz[b,f]azepine-3-carboxylic acid, after recrystallization from ethanol, melts at 226°-228°.

The corresponding 5-butyryl-10,11-dihydro-5H-dibenz[b,f]azepine-3-carboxylic acid is produced as follows:
c. 3-acetyl-5-butyryl-10,11-dihydro-5H-dibenz[b,f]azepine 9.2 g. of 5-butyryl-10,11-dihydro-5H-dibenz[b,f]azepine are dissolved in 50 ml. of carbon disulfide and mixed with 3.43 g. of acetyl chloride. 19 g. of aluminum chloride are introduced, in portions, at 40° within 40 minutes. The mixture is refluxed for 1 hour and then mixed with 3.43 g. of acetyl chloride. After refluxing for 15 hours, 50 ml. of carbon disulfide, 1.5 g. of acetyl chloride and 5 g. of aluminum chloride are added and the mixture is refluxed for a further 20 hours. The carbon disulfide is now separated and the brown, resinous residue is triturated with a lot of ice and 5N hydrochloric acid. The suspension is extracted with ethyl acetate, the organic phase is washed with 2N sodium carbonate solution, dried and concentrated by evaporation. A colorless oil remain behind, which can be further used without purification.
d. 5-butyryl-10,11-dihydro-5H-dibenz[b,f]azepine-3-carboxylic acid 30.7 g. of 3-acetyl-5-*butyryl*-10,11-dihydro-5H-dibenz[b,f]azepine are dissolved in 300 ml. of dioxane and 100 ml. of water and, while stirring, 240 ml. of 100 percent aqueous sodium hypochlorite solution are added dropwise at 0° within 30 minutes. The reaction mixture is stirred first for 30 minutes at 0° and then for 2 hours at room temperature. The dioxane is then evaporated off in vacuo. The aqueous phase which remains behind is washed with ether and then acidified with concentrated hydrochloric acid. The precipitated crystals are taken up in sodium hydrogen carbonate solution, the solution is filtered and acidified with diluted hydrochloric acid. The precipitated crystals are filtered by suction, dried and recrystallized from benzene/cyclohexane. The thus obtained 5-butyryl-10,11-dihydro-5H-dibenz[b,f]azepine-3-carboxylic acid melts at 108°-110°.
e. 5-methyl-10,11-dihydro-5H-dibenz[b,f]azepine-3-methanol 9.5 g. of the above 5-formyl-3-carboxylic acid are dissolved in 100 ml. of freshly distilled absolute tetrahydrofuran. Within 1½ hours at 8°-12°, diborane is introduced, which is produced from 7 g. of sodium boron hydride and 38.8 ml. of boron trifluoride etherate in 230 ml. of diethylene glycol dimethylether according to Organic Reactions 13, 31 (1963). The solution is stirred for a further 2 hours at 0°-5° and then it is carefully mixed at —10 to 0° with 20 ml. of water. The mixture is made acidic with 2N hydrochloric acid and diluted with 500 ml. of water. It is then extracted with ethyl acetate and the obtained organic phase is washed with 2N sodium carbonate solution. The ethyl acetate is evaporated off and a colorless oil is obtained which can be further processed without purification.

In an analogous manner
e'. 5-n-butyl-10,11-dihydro-5H-dibenz[b,f]azepine-3-methanol is obtained as a colorless oil, starting with 10.3 g. of 5-butyryl-10,11-dihydro-5H-dibenz[b,f]azepine-3-carboxylic acid.
f. 3-Bromomethyl-5-methyl-10,11-dihydro-5H-dibenz[b,f]azepine A solution of 8.5 g. of the above product obtained under (e) in 300 ml. of chloroform is saturated at 0° with hydrogen bromide, stirred for 12 hours at 20°-25° and then washed with 2N sodium carbonate solution. The organic phase is concentrated by evaporation, whereby the 3-bromomethyl-5-methyl-10,11-dihydro-5H-dibenz[b,f]azepine remains behind as a colorless oil.

In an analogous manner
f'. 3-bromomethyl-5-n-butyl-10,11-dihydro-5H-dibenz[b,f]azepine is obtained as a colorless oil, starting with 8.9 g. of 5-n-butyl-10,11-dihydro-5H-dibenz[b,f]azepine-3-methanol (oil).
g. 5-Methyl-10,11-dihydro-5H-dibenz[b,f]azepine-3-acetonitrile 12.7 g. of the above bromo compound (f) are stirred with 6.3 g. of potassium cyanide in 100 ml. of dimethyl sulfoxide for 5 hours at 40°-50°, then poured onto ice and mixed with 500 ml. of water. After extraction with a large amount of ether and evaporation of the solvent, the 5-methyl-10,11-dihydro-5H-dibenz[b,f]azepine-3-acetonitrile is obtained as colorless crystals, m.p. 78°-81° (from ethyl acetate).

g'. 5-n-Butyl-10,11-dihydro-5H-dibenz[b,f]azepine-3-acetonitrile (oil) is obtained analogously starting with 7.7 g. of 3-bromomethyl-5-n-butyl-10,11-dihydro-5H-dibenz[b,f]azepine.

EXAMPLE 2

5,α-dimethyl-10,11-dihydro-5H-dibenz[b,f]azepine-3-acetic acid

The solution of 3.4 g. of 5,α-dimethyl-10,11-dihydro-5H-dibenz[b,f]azepine-3-acetonitrile in 170 ml. of chloroform and 17 ml. of absolute ethanol is saturated at 0°–5° with hydrogen chloride and then stirred for 14 hours at 20°–25°. The solution is then concentrated by evaporation, the residue is stirred with 35 ml. of dioxane and 7 ml. of water for 5 hours at 40° and again concentrated by evaporation. The crude ethyl ester is refluxed for 1 hour with 35 ml. of ethanol and 10 ml. of 5N sodium hydroxide solution. The ethanol is distilled off and the alkaline solution remaining behind is acidified with 2N hydrochloric acid. The obtained aqueous suspension is extracted with ethyl acetate and the organic phase is then repeatedly extracted with 2N sodium carbonate solution. The sodium carbonate solutions are combined and acidified with 2N hydrochloric acid. The precipitated, pale yellow crystals are filtered by suction and recrystallized from cyclohexane. The 5,α-dimethyl-10,11-dihydro-5H-dibenz[b,f]azepine-3-acetic acid, m.p. 138°–140° (from benzene) is obtained.

The starting material for the above example is produced as follows:

a. 3-Acetyl-5-formyl-10,11-dihydro-5H-dibenz[b,f]azepine 70 ml. of acetic anhydride are mixed at 35°–40° with 35 ml. of formic acid. After 1 hour, 10 g. of 3-acetyl-10,11-dihydro-5H-dibenz[b,f]azepine are added to the solution at 45°–50° within 1½ hours. The mixture is then stirred for 2½ hours at 45°–50. 100 ml. of water are then slowly added dropwise at 45°–50. After cooling, the mixture is extracted with ethyl acetate. The 3-acetyl-5-formyl-10,11-dihydro-5H-dibenz[b,f]azepine, after recrystallization from benzene/petroleum ether, melts at 111°–113°.

b. 5,α-dimethyl-10,11-dihydro-5H-dibenz[b,f]azepine-3-methanol.

7.3 g. of the above 3-acetyl-5-formyl compound are dissolved in 100 ml. of freshly distilled absolute tetrahydrofuran. Diborane is introduced at 8°–12° within 1½ hours. The diborane is produced from 7 g. of sodium boron hydride and 38.8 ml. of boron trifluoride etherate in 230 ml. of diethylene glycol dimethyl ether according to Organic Reactions 13, 31 (1963). The solution is further stirred for 2 hours at 0°–5° and then carefully mixed at −10° to 0° with 20 ml. of water. The mixture is rendered acid with 2N hydrochloric acid and is diluted with 500 ml. of water. It is then extracted with ethyl acetate and the obtained organic phase is washed with 2N sodium carbonate solution. With evaporation of the ethyl acetate, the 5, α-dimethyl-10,11-dihydro-5H-dibenz[b,f]azepine-3-methanol remains behind as a colorless oil, which can be further processed without purification.

c. 3-(1-bromoethyl)-5-methyl-10,11-dihydro-5H-dibenz[b,f]azepine.

A solution of 3.1 g. of the above reduction product in 100 ml. of chloroform is saturated at 0° with hydrogen bromide. The solution is stirred for 12 hours at 20°–25° and then washed with 2N sodium carbonate solution. The organic phase is concentrated by evaporation, whereby the 3-(1-bromethyl)-5-methyl-10,11-dihydro-5H-dibenz[b,f]azepine remains behind as a colorless oil.

d. 5,α-dimethyl-10,11-dihydro-5H-dibenz[b,f]azepine-3-acetonitrile.

2.5 g. of the above bromine compound are stirred with 1.3 g. of potassium cyanide in 20 ml. of dimethyl sulfoxide for 5 hours at 40°–50° and then poured onto ice and mixed with 120 ml. of water. After extraction with a lot of ether and evaporation of the solvent, the 5,α-dimethyl-10,11-dihydro-5H-dibenz[b,f]azepine-3-acetonitrile is obtained as oil.

EXAMPLE 3

10,11-dihydro-5H-dibenz[b,f]azepine-2-acetic acid

A solution of 6 g. of 5-benzyl-10,11-dihydro-5H-dibenz[b,f]azepine-2-acetonitrile in 90 ml. of absolute ether and 60 ml. of absolute ethanol is cooled, while stirring and with the exclusion of moisture, to 5°. Dry hydrogen chloride is introduced into the solution during 3 hours, whereby the temperature has not to exceed 5°. During a further 5 hours, hydrogen chloride is introduced into the solution at room temperature. The solution is then allowed to stand for 15 hours at room temperature and is then evaporated to dryness under 11 Torr. at 40°. The residue is dissolved in 20 ml. of ether and the whole is refluxed on the water bath for 1½ hours. The mixture is then cooled, the ether phase is separated and the aqueous solution is again extracted with 30 ml. of ether. The combined ether solutions are dried over magnesium sulfate and concentrated by evaporation under 11 Torr. at 40°.

The crude 10,11-dihydro-5H-dibenz[b,f]azepine-2-acetic acid ethyl ester which remains behind is dissolved in 200 ml. of ethanol and 50 ml. of 2N sodium hydroxide solution. The solution is refluxed for 3 hours and concentrated by evaporation to dryness under 11 Torr. at 50°. The residue is dissolved in 100 ml. of water and the aqueous solution is extracted with 50 ml. of ether. The ethereal phase is separated and the aqueous phase acidified by the addition of 2N hydrochloric acid. The precipitated oil is dissolved in 100 ml. of ether, the ethereal solution washed with 20 ml. of water and dried over sodium sulfate. It is then concentrated under 11 Torr. at 40°, whereby the 10,11-dihydro-5H-dibenz[b,f]azepine-2-acetic acid crystallizes out, m.p. 155°–158°.

3'. Obtained analogously are the 5-methyl-10,11-dihydro-5H-dibenz[b,f]azepine-2-acetic acid, m.p. 121°–123° starting with 5-methyl-10,11 dihydro-5H-dibenz[b,f]azepine-2-acetonitrile, and 3''. 7-chloro-5-methyl-10,11-dihydro-5H-dibenz[b,f]azepine-2-acetic acid, m.p. 175°–187°, starting with 7-chloro-5-methyl-10,11-dihydro-5H-dibenz[b,f]azepine-2-acetonitrile.

The nitrile required as starting material is produced as follows:

a. 5-benzyl-10,11-dihydro-5H-dibenz[b,f]azepine-2-carboxaldehyde 61 g. of distilled phosphorus oxychloride are added dropwise at 10° to 120 ml. of dimethyl formamide within 10 minutes. The mixture is cooled to 0° and, while stirring well, a solution of 38 g. of 5-benzyl-10,11-dihydro-5H-dibenz[b,f]azepine (b.p. 178°–181°/0.15 Torr., m.p. 66°–68° from ethanol, produced by condensation of 10,11-dihydro-5H-dibenz[b,f]azepine with benzyl chloride by means of sodium amide in boiling toluene) in 60 ml. of dimethyl formamide is added dropwise within 1 hour at, at the most, 10°. The reaction mixture is then stirred for 1 hour at 70°–75°. The dark orange colored mixture is cooled and poured onto 500 g. of ice, whereby the crude aldehyde precipitates as resin. The formed suspension is adjusted to pH 7 using concentrated sodium carbonate solution and then extracted with chloroform. The chloroform solution is washed with water, dried over calcium chloride and concentrated by evaporation in vacuo. The resin remaining behind is dissolved, while heating, in 350 ml. of cyclohexane. The 5-benzyl-10,11-dihydro-5H-dibenz[b,f]azepine-2-carboxaldehyde which crystallized upon cooling is filtered by suction, m.p. 99.5°–101°.

a'. 5-methyl-10,11-dihydro-5H-dibenz[b,f]azepine-2-carboxaldehyde, m.p. 90°–93° (from ethyl acetate/ether), is obtained analogously starting with 5-methyl-10,11-dihydro-5H-dibenz[b,f]azepine (m.p. 106°–107° from ethanol). The latter is obtained by condensation of 10,11-dihydro-5H-dibenz[b,f]azepine with methyl iodide by means of sodium hydride in dimethyl formamide at 70°.

b. 7-chloro-5-methyl-10,11-dihydro-5H-dibenz[b,f]azepine-2-carboxaldehyde is produced as follows:

330 g. of phosphorus oxychloride are added dropwise to 700 ml. of dimethyl formamide at 10° within 15 minutes. The mixture is cooled to 0° and, while stirring well, a solution of 150 g. of 3-chloro-5-methyl-10,11-dihydro-5H-dibenz[b,f]azepine (b.p. 170°/0.001 Torr., m.p. 56°–58° from ethanol, produced by condensation of 3-chloro-10,11-dihydro-5H-dibenz[b,f]azepine with methyl iodide by means of sodium hydride in dimethyl formamide at 50°) in 700 ml. of dimethyl formamide is added within 1 hour at a maximum temperature of 10°. The mixture is then stirred for 2 hours at 70°, cooled and poured onto 2,000 g. of ice, whereby the oil precipitates. By the addition of sodium carbonate, the mixture is adjusted to pH 7 and extracted with chloroform. The chloroform solution is washed with water, dried over calcium chloride and concentrated by evaporation in vacuo. The residue, a yellow oil, is a mixture of 7-chloro-5-methyl-10,11-dihydro-5H-dibenz[b,f]azepine-2-carboxaldehyde and 3-chloro-5-methyl-10,11-dihydro-5H-dibenz[b,f]azepine-2-carboxaldehyde.

c. 5-benzyl-10,11-dihydro-5H-dibenz[b,f]azepine-2-methanol 11.7 g. of lithium aluminum hydride are suspended in 250 ml. of absolute ether and, while stirring, cooled to 5°. A solution of 50 g. of 5-benzyl-10,11-dihydro-5H-dibenz[b,f]azepine-2-carboxaldehyde in 600 ml. of absolute ether and 150 ml. of absolute tetrahydrofuran are slowly added dropwise under nitrogen and with external cooling using an ice bath. The mixture is subsequently stirred for 18 hours at room temperature. It is then cooled to 5° and, while stirring, 12 ml. of water, 12 ml. of 15 percent sodium hydroxide solution and again 36 ml. of water are added dropwise to the mixture. The latter is stirred for 2 hours at room temperature and then filtered. The filtrate is concentrated by evaporation under 11 Torr. at 40° and the residue is distilled. The 5-benzyl-10,11-dihydro-5H-dibenz[b,f]azepine-2-methanol is obtained as a yellow oil, b.p. 190°–200°/0.01 Torr.

c'. 5-methyl-10,11-dihydro-5H-dibenz[b,f]azepine-2-methanol, m.p. 78°–79° (from ether/petroleum ether) is obtained analogously, starting from the aldehyde described under 3a').

d. 7-chloro-10,11-dihydro-5H-dibenz[b,f]azepine-2-methanol is obtained as follows:

70 g. of lithium aluminum hydride are suspended in 900 ml. of absolute ether and, while stirring, cooled to 5°. To this is slowly added dropwise, under nitrogen and using an ice bath for external cooling, a solution of 165 g. of a mixture consisting of 7-chloro-5-methyl-10,11-dihydro-5H-dibenz[b,f]azepine-2-carboxaldehyde and 3-chloro-5-methyl-10,11-dihydro-5H-dibenz[b,f]azepine-2-carboxaldehyde (see (b) in 500 ml. of absolute ether and 300 ml. of absolute tetrahydrofuran. The mixture is then stirred for 18 hours at room temperature. The mixture is cooled to 5° and, while stirring 70 ml. of water, 70 ml. of 15 percent sodium hydroxide solution and a further 210 ml. of water are added. The mixture is filtered and then washed with 300 ml. of ether. The filtrate is concentrated by evaporation under 11 Torr. at 40°. The residue, a mixture consisting of 7-chloro-5-methyl-10,11-dihydro-5H-dibenz[b,f]azepine-2-methanol and 3-chloro-5-methyl-10,11-dihydro-5H-dibenz[b,f]azepine-2-methanol, is chromatographed on 3,000 g. of neutral aluminum oxide. The fractions 25–28, eluted in each case with 3,000 ml. of ether, contain the approximately pure 7-chloro-5-methyl-10,11-dihydro-5H-dibenz[b,f]azepine-2-methanol as a yellowish oil.

e. 2-bromomethyl-5-benzyl-10,11-dihydro-5H-dibenz[b,f]azepine

A solution of 5 g. of 5-benzyl-10,11-dihydro-5H-dibenz[b,f]azepine-2-methanol in 100 ml. of chloroform is cooled to −5° using an ice/sodium chloride bath. While stirring, hydrogen bromide is introduced into the solution during an hour. The solution is then stirred during 1 hour at 0°. The mixture is poured onto 200 g. of ice and the precipitated oil is extracted with 200 ml. of ether. The ether solution is separated, extracted three times with 50 ml. of 2N sodium carbonate solution and water, dried over magnesium sulfate and concentrated to dryness by evaporation under 11 Torr. at 40°.

The 2-bromomethyl-5-benzyl-10,11-dihydro-5H-dibenz[b,f]azepine remains behind as an oil and is directly further reacted.

f. 2-chloromethyl-5-benzyl-10,11-dihydro-5H-dibenz[b,f]azepine

A solution of 1.6 g. of 5-benzyl-10,11-dihydro-5H-dibenz[b,f]azepine-2-methanol in 20 ml. of absolute ether and 2 ml. of absolute pyridine is quickly added dropwise to a solution, cooled to 0°, of 2 ml. of thionyl chloride and 2 ml. of pentane. The mixture is then stirred for 1 hour at 0° and then diluted with 10 ml. of pentane. The mixture is extracted at 5°, twice in each case, with 10 ml. of 1N hydrochloric acid, 10 ml. of 1N sodium hydroxide solution and 10 ml. of water. It is dried over potassium carbonate and concentrated to dryness under 11 Torr. at 40°. The 2-chloromethyl-5-benzyl-10,11-dihydro-5H-dibenz[b,f]azepine is obtained as yellow oil.

f'. 2-Chloromethyl-5-methyl-10,11-dihydro-5H-dibenz[b,f]azepine is obtained as yellow oil in an analogous manner.

f''. 7-chloro-2-chloromethyl-5-methyl-10,11-dihydro-5H-dibenz[b,f]azepine (oil) is obtained analogously.

g. 5-benzyl-10,11-dihydro-5H-dibenz[b,f]azepine-2-acetonitrile

A solution of 5 g. of 2-bromomethyl-5-benzyl-10,11-dihydro-5H-dibenz[b,f]azepine (cf. e₁) in 20 ml. of dimethyl sulfoxide is added, while stirring, to a suspension of 2.5 g. of sodium cyanide in 30 ml. of dimethyl sulfoxide at 40°. The mixture is then stirred for 15 hours at 40° and diluted with 400 ml. of ice water. The solution is extracted four times with 200 ml. of ethyl acetate. The ethyl acetate solutions are washed with 150 ml. of 6N hydrochloric acid and then with 50 ml. of water. They are subsequently dried with magnesium sulfate and concentrated by evaporation under 11 Torr. at 40°. The residue is chromatographed on 200 g. of neutral aluminum oxide. The fractions 3–6, eluted with ether, contain the 5-benzyl-10,11-dihydro-5H-dibenz[b,f]azepine-2-acetonitrile, which when concentrated by evaporation, remains behind as yellow oil. The crude product is crystallized from ether, m.p. 96°–98°.

g'. 5-methyl-10,11-dihydro-5H-dibenz[b,f]azepine-2-acetonitrile, m.p. 70°–71° (from ether/petroleum ether) is obtained analogously from 2-chloro-methyl-5-methyl-10,11-dihydro-5H-dibenz[b,f]azepine.

g''. 7-chloro-5-methyl-10,11-dihydro-5H-dibenz[b,f]azepine-2-acetonitrile, m.p. 117°–119° (from methanol) is obtained analogously starting with 17 g. of 7-chloro-2-chloromethyl-5-methyl-10,11dihydro-5H-dibenz[b,f]azepine (oil).

g₁. 5-benzyl-10,11dihydro-5H-dibenz[b,f]azepine-2-acetonitrile

The 5-benzyl-10,11-dihydro-5H-dibenz[b,f]azepine-2-acetonitrile is obtained analogously to example (g) from 2-chloromethyl-5-benzyl-10,11-dihydro-5H-dibenz[b,f]azepine (cf. (f)). The residue of the ethyl acetate solution is crystallized from ether, m.p. 96°–98°, without a preceding chromatographic purification.

EXAMPLE 4

10,11-dihydro-5H-dibenz[b,f]azepine-2-acetic acid

A solution of 1.2 g. of 10,11-dihydro-5H-dibenz[b,f]azepine-2-acetic acid methyl ester in 100 ml. of ethanol and 15 ml. of 2N sodium hydroxide solution is refluxed for 30 minutes and concentrated to dryness by evaporation under 11 Torr. at 50°. The residue is dissolved in 50 ml. of water and the aqueous solution extracted with ether. The ethereal phase is separated and the aqueous phase is acidified by the addition of 2N hydrochloric acid. The precipitated crystals are filtered off, washed with a little water and dissolved in 40 ml. of ether. The ethereal solution is dried over magnesium sulfate and concentrated under 11 Torr. at 40°. The 10,11-dihydro-5H-dibenz[b,f]azepine-2-acetic acid crystallizes out. After a single crystallization from ether, it melts at 155°–158°.

EXAMPLE 5

5-methyl-10,11-dihydro-5H-dibenz[b,f]azepine-3-acetic acid 0.9 g. of crude 5-methyl-10,11-dihydro-5H-dibenz[b,f]azepine-3-acetic acid methyl ester are refluxed with 20 ml. of ethanol and 7 ml. of 5N sodium hydroxide solution for 1 hour. The ethanol is distilled off and the alkaline solution remaining behind is acidified with 2N hydrochloric acid. The formed, aqueous suspension is extracted with ethyl acetate, the organic phase is dried and concentrated by evaporation, whereby the 5-methyl-10,11-dihydro-5H-dibenz[b,f]azepine-3-acetic acid remains as yellow crystals, m.p. 140°–141° after recrystallization from cyclohexane.

Analogously produced are:

5'. 5-n-butyl-10,11-dihydro-5H-dibenz[b,f]azepine-3-acetic acid (oil), starting with 1.3 g. of crude 5-n-butyl-10,11dihydro-5H-dibenz[b,f]azepine-3-acetic acid methyl ester, and 5''. α,5-*dimethyl*-10,11-*dihydro-5H-dibenz[b,f]azepine*-3-*acetic acid*, m.p. 138°–140', starting with 1,2 g. α,5-dimethyl-10,11-dihydro-5H-dibenz[b,f]azepine-3-acetic acid methyl ester.

The starting materials can be produced as follows:

a. 10,11-dihydro-5H-dibenz[b,f]azepine-3-acetic acid methyl ester 2.0 g. of 10,11-dihydro-5H-dibenz[b,f]azepine-3-acetic acid are refluxed with 50 ml. of absolute methanol and 200 mg. of p-toluene sulfonic acid for 14 hours.

The solvent is evaporated off under vacuum, the residue dissolved in ethyl acetate and the solution washed with 2N sodium carbonate solution. After evaporation of the ethyl acetate, the 10,11-dihydro-5H-dibenz[b,f]azepine-3-acetic acid methyl ester remains behind as oil.

a'. α-methyl-10, -dihydro-5*H-dibenz[b,f]azepine*-3-acetic acid methyl ester is produced analogously.

b. 5-formyl-10,11-dihydro-5H-dibenz[b,f]azepine-3-acetic acid methyl ester.

10 ml. of formic acid are added dropwise at 35° to 20 ml. of acetic anhydride. The solution is stirred for 1 hour at 20°–25° and then heated to 45°. 2.1 g. of 10,11-dihydro-5H-dibenz[b,f]azepine-3-acetic acid methyl ester, dissolved in 6 ml. of acetic anhydride, are added dropwise within 15 minutes. After stirring for 2 hours at 45°–47°, the solution is mixed with 200 ml. of water. It is allowed to stand for 2 hours and then extracted with ether. The ether solution is washed with 2N sodium carbonate solution and then concentrated by evaporation, whereby the 5-formyl-10,11dihydro-5H-dibenz[b,f]azepine-3-acetic acid methyl ester remains behind, m.p. 85°–87° (from ether).

b'. The following is produced analogously:
5-formyl-α-methyl-10,11-dihydro-5H-dibenz[b,f]azepine acetic acid methyl ester (oil).

c. 5-methyl-10,11-dihydro-5H-dibenz[b,f]azepine-3-acetic acid, m.p. 182°–184° (from methanol/ethyl acetate).

c. 1.5 g. of 5-formyl-10,11-dihydro-5H-dibenz[b,f]azepine-3-acetic acid methyl ester are dissolved in 20 ml. of freshly distilled absolute tetrahydrofuran. Diborane is introduced at −15° to −10° within 1½ hours. The diborane is produced from 1.05 g. of sodium boron hydride and 5.9 ml. of boron trifluoride etherate in 34.5 ml. of diethylene glycol dimethyl ether according to Organic Reactions 13, 31 (1963). The solution is further stirred for 2 hours at 0° and then at −10° to −5° carefully mixed with 3 ml. of water. The mixture is rendered acid with 2N hydrochloric acid and diluted with 75 ml. of water. It is then extracted with ethyl acetate and the obtained organic phase washed with 2N sodium carbonate solution. After evaporation of the ethyl acetate, the 5-methyl-10,11-dihydro[b,f]azepine-3-acetic acid methyl ester remains as a colorless oil.

c'. 5-n-butyl-10,11-dihydro-5H-dibenz[b,f]azepine-3-acetic acid methyl ester (oil) is produced analogously, starting with 1.8 g. of 5-n-butyryl-10,11-dihydro-5H-dibenz[b,f]azepine-3-acetic acid methyl ester.

EXAMPLE 6

5-methyl-10,11-dihydro-5H-dibenz[b,f]azepine-3-acetic acid

A mixture of 24 g. of 3-acetyl-5-methyl-10,11-dihydro-5H-dibenz[b,f]azepine, 5 g. of sulfur and 50 ml. of morpholine is refluxed for 18 hours. After cooling, the reaction mixture is taken up in ethyl acetate and washed with 2N hydrochloric acid. The organic phase is concentrated by evaporation and the residue, which contains the 4-(5-methyl-10,11-dihydro-5H-dibenz[b,f]azepine-3-thioacetyl)-morpholine, is refluxed with 15 g. of potassium hydroxide in 250 ml. of absolute ethylene glycol for 4½ hours. The reaction mixture is poured onto 1,200 ml. of water and extracted with ether. The aqueous-alkaline phase is made acid with 5N hydrochloric acid and extracted with ether. After evaporation of the solvent, the residue is recrystallized from cyclohexane. The obtained 5-methyl-10,11-dihydro-5H-dibenz[b,f]azepine-3-acetic acid melts at 140°–141°.

The starting material for the above example is produced as follows:

a. 3-acetyl-5-methyl-10,11-dihydro-5H-dibenz[b,f]azepine.

13 g. of 3-acetyl-10,11-dihydro-5H-dibenz[b,f]azepine are heated with 60 ml. of methanol and 28 ml. of methyl iodide in a bomb tube for 24 hours at 100°. The brown solution is concentrated by evaporation. The residue is taken up in methylene chloride, decolorized with sodium thiosulfate, dried with sodium sulfate and concentrated by evaporation. The 3-acetyl-5-methyl-5H-dibenz[b,f]azepine remains behind as a yellowish oil, which does not crystallize and which can be directly further processed.

EXAMPLE 7

10,11-dihydro-5H-dibenz[b,f]azepine-3-acetic acid

A mixture of 28.0 g. of 3,5-diacetyl-10,11-dihydro-5H-dibenz[b,f]azepine, 5.0 g. of sulfur and 50 ml. of morpholine is refluxed for 18 hours. After cooling, the reaction mixture is taken up in ethyl acetate and washed with 2N hydrochloric acid. The organic phase is concentrated by evaporation and the residue, which contains the 4-(5-acetyl-10,11-dihydro-5H-dibenz[b,f]azepine-3-thioacetyl)-morpholine, is refluxed with 35.0 g. of potassium hydroxide in 350 ml. of absolute ethylene glycol for 4½ hours. The reaction mixture is poured onto 1,200 ml. of water and extracted with ether. The aqueous-alkaline solution is made acid with 5N hydrochloric acid and extracted with ether. After evaporation of the solvent, the residue is recrystallized from benzene. The 10,11-dihydro-5H-dibenz[b,f]azepine-3-acetic acid is contained as colorless crystals, which melt at 133°–135°.

7'. 7-chloro-10,11-dihydro-5H-dibenz[b,f]azepine-3-acetic acid, m.p. 155°–157° (from benzene) is obtained analogously, starting with 3,5-diacetyl-7-chloro-10,11-dihydro-5H-dibenz[b,f]azepine (oil).

The starting materials are produced as follows:

a. 3-chloro-5-acetyl-10,11-dihydro-5H-dibenz[b,f]azepine

A solution of 300 g. (1.31 mol) of 3-chloro-10,11-dihydro-5H-dibenz[b,f]azepine in 1,000 ml. of absolute benzene is mixed dropwise at 60°–70° with a solution of 125 g. (1.59 mol) of acetyl chloride in 600 ml. of absolute benzene. The brown solution is refluxed for 5 hours and, after cooling, it is mixed with 200 ml. of water and stirred for 1 hour at 20°–25°. The upper organic phase is separated, washed with diluted ammonia and brine and dried over sodium sulfate. After evaporation of the benzene, the residue is recrystallized from ethanol. The 3-chloro-5-acetyl-10,11-dihydro-5H-dibenz[b,f]azepine melts at 119°–120°.

b. 3,5-diacetyl-7-chloro-10,11-dihydro-5H-dibenz[b,f]azepine

A suspension of 163.5 g. (0.6 mol) of 3-chloro-5-acetyl-10,11-dihydro-5H-dibenz[b,f]azepine in 850 ml. of carbon disulfide is mixed at 40° with a few crystals of iodine and 135 g. (1.72 mol) of acetyl chloride. 250 g. (1.87 mol) of aluminum chloride are added within 1 hour and the mixture is then refluxed for 1 hour. A further 125 g. (0.94 mol) of aluminum chloride are now added and the brown suspension is refluxed for 12 hours. After addition, each time, of 66.6 g.

(0.5 mol) of aluminum chloride and 26.1 g. (0.33 mol) of acetyl chloride, the suspension is boiled in each case for a further 24 hours. This process is repeated six times, so that the reaction mixture can be worked up after 1 week. The carbon disulfide is decanted and the brown resin remaining behind is triturated with diluted hydrochloric acid and ice, and subsequently extracted with ethyl acetate. The organic phase is washed with 2N sodium carbonate solution and brine, dried over sodium sulfate and concentrated by evaporation. The oily residue can be further used without purification. Analytically pure 3,5-diacetyl-7-chloro-10,11-dihydro-5H-dibenz[b,f]azepine is obtained by chromatography on 40 times the amount of silica gel. It is eluted with benzene/ether 1:1 and exists as oil.

EXAMPLE 8

5-methyl-10,11-dihydro-5H-dibenz[b,f]azepine-3-acetic acid

The solution of 10.0 g. of 5-methyl-10,11-dihydro-5H-dibenz[b,f]azepine-3-acetonitrile in 500 ml. of chloroform and 50 ml. of absolute ethanol is saturated at 0°–5° with hydrogen chloride and the solution, after stirring for 14 hours, is concentrated by evaporation at 20°–25°. The oily imido ester hydrochloride is refluxed for 1 hour with 100 ml. of ethanol and 30 ml. of 5N sodium hydroxide solution. The ethanol is distilled off and the alkaline solution remaining behind is acidified with 2N hydrochloric acid. The formed aqueous suspension is extracted with ethyl acetate and the organic phase then repeatedly extracted with 2N sodium carbonate solution. The sodium carbonate solutions are combined and acidified with 2N hydrochloric acid. The precipitated, pale yellow crystals are filtered by suction and recrystallized from cyclohexane. The 5-methyl-10,11-dihydro-5H-dibenz[b,f]azepine-3-acetic acid, m.p. 140°–141° is obtained.

EXAMPLE 9

5-methyl-10,11-dihydro-5H-dibenz[b,f]azepine-2-acetic acid

A mixture consisting of 5.2 g. of 2-acetyl-5-methyl-10,11-dihydro-5H-dibenz[b,f]azepine, 2.1 g. of sulfur and 6.1 g. of morpholine is refluxed for 15 hours (bath temperature 150°). After cooling, the reaction mixture is taken up in benzene. The benzene solution is filtered through a layer of neutral aluminum oxide and the filtrate is concentrated by evaporation to dryness under 11 Torr. The 4-(5-methyl-10,11-dihydro-5H-dibenz[b,f]azepine-2-thioacetyl)-morpholine remaining behind is refluxed with 6 g. of potassium hydroxide in 100 ml. of absolute ethylene glycol for 4½ hours. The reaction mixture is poured onto 900 ml. of water and extracted with ether. The aqueous-alkaline phase is made acid with concentrated hydrochloric acid and extracted with ether. The ether phase is washed with water, dried over magnesium sulfate and concentrated by evaporation to dryness under 11 Torr. The 5-methyl-10,11-dihydro-5H-dibenz[b,f]azepine-2-acetic acid crystallizes from ether/petroleum ether, m.p. 121°–123°.

The starting materials for the above example are produced as follows:

a. 5-methyl-10,11-dihydro-5H-dibenz[b,f]azepine-2-carboxaldoxime

A solution of 23.7 g. of 5-methyl-10,11-dihydro-5H-dibenz[b,f]azepine-2-carboxaldehyde (m.p. 90°–93°), 17.5 g. of hydroxylamine-hydrochloride and 18 ml. of pyridine in 200 ml. of ethanol is refluxed for 1 hour. The solution is cooled and concentrated to dryness under 11 Torr. at 50°. The residue is mixed with 150 ml. of water and extracted with ether. The ethereal solution is extracted with water, dried over magnesium sulfate and concentrated under 11 Torr., whereby the 5-methyl-10,11-dihydro-5H-dibenz[b,f]azepine-2-carboxaldoxime crystallizes out. Recrystallized from ether/petroleum ether, the substance melts at 148°–150°.

b. 2-cyano-5-methyl-10,11-dihydro-5H-dibenz[b,f]azepine

A solution of 30.3 g. of 5-methyl-10,11-dihydro-5H-dibenz[b,f]azepine-2-carboxaldoxime in 180 ml. of acetic anhydride is refluxed for 2 hours. The solution is then cooled and concentrated to dryness under 11 Torr. at 40°. The residue is dissolved in ethanol, the ethanolic solution boiled up with active charcoal and filtered. The filtrate is somewhat concentrated under 11 Torr. and is left to stand at room temperature, whereby the 2-cyano-5-methyl-10,11-dihydro-5H-dibenz[b,f]azepine slowly crystallizes out, m.p. 120°–122°.

c. 2-acetyl-5-methyl-10,11-dihydro-5H-dibenz[b,f]azepine 70 ml. of absolute benzene are added to a Grignard solution consisting of 6 g. of magnesium and 3.5 g. of methyl iodide in 200 ml. of ether. The Grignard solution is then mixed with a solution of 23.4 g. of 2-cyano-5-methyl-10,11-dihydro-5H-dibenz[b,f]azepine in 150 ml. of ether. The mixture is then refluxed for 5 hours cooled, and 300 ml. of water and 300 ml. of ether are then added, whereupon the mixture is refluxed for 10 hours. The ether solution is then separated, washed with water, dried over magnesium sulfate and concentrated to dryness under 11 Torr. The residue is dissolved in ether. The ether solution is filtered through a layer of neutral aluminum oxide and concentrated under 11 Torr. The 2-acetyl-5-methyl-10,11-dihydro-5H-dibenz[b,f]azepine crystallizes from ether/petroleum ether, m.p. 80°–83°.

EXAMPLE 10

5-methyl-10,11-dihydro-5H-dibenz[b,f]azepine-2-acetic acid 2 g. of 5-methyl-10,11-dihydro-5H-dibenz[b,f]azepine-2-acetamide are refluxed with 9 g. of potassium hydroxide in 60 ml. of n-butanol for 1 hour. The solution is then concentrated under 0.1 Torr. at 60°, and the residue is dissolved in water. The aqueous solution is extracted with ether, separated and acidified with concentrated hydrochloric acid. The precipitated oil is extracted with ether. The ether solution is washed with water, dried over magnesium sulfate and concentrated to dryness under 11 Torr. The residue is crystallized from ether/petroleum ether. The 5-methyl-10,11-dihydro-5H-dibenz[b,f]azepine-2-acetic acid melts at 121°–123°.

The starting material for the above example is produced as follows:

a. 5-methyl-10,11-dihydro-5H-dibenz[b,f]azepine-2-acetamide

A solution of 5 g. of 5-methyl-10,11-dihydro-5H-dibenz[b,f]azepine-2-acetonitrile (m.p. 70°–71°) in 50 ml. of acetone and 10 ml. of water is mixed at 20° with 6 ml. of 30 percent aqueous hydrogen peroxide solution and subsequently with 2 ml. of 2N sodium hydroxide solution. The reaction solution is heated for 20 minutes at 50°, whereby evolution of oxygen occurs. A further 6 ml. of 30 percent hydrogen peroxide solution and 2 ml. of 2N sodium hydroxide solution are added and the mixture is heated for a further 4 hours at 50°. The reaction solution is then concentrated to dryness under 11 Torr. at 50°. The residue is dissolved in methanol. The methanolic solution is boiled up with active charcoal and filtered. The filtrate is concentrated somewhat under 11 Torr., whereby the 5-methyl-10,11-dihydro-5H-dibenz[b,f]azepine-2-acetamide crystallizes out, m.p. 140°–142°.

EXAMPLE 11

5-methyl-10,11-dihydro-5H-dibenz[b,f]azepine-2-acetic acid

To a solution of 75 g. of potassium hydroxide in 500 ml. of n-butanol are added 16 g. of 5-methyl-10,11-dihydro-5H-dibenz[b,f]azepine-2-acetonitrile. The mixture is refluxed for 2 hours, cooled and concentrated by evaporation to dryness under 0.01 Torr. at 60°. The residue is dissolved in 1,500 ml. of water. The aqueous solution is extracted three times with 300 ml. of ether each time, separated and acidified at 5° with 2N hydrochloric acid. The precipitated oil is extracted with ether. The ether solution is separated, washed with water, dried with magnesium sulfate and concentrated by evaporation to dryness under 11 Torr. The residue is crystallized from ether/petroleum ether. The 5-methyl-10,11-dihydro-5H-dibenz[b,f]azepine-2-acetic acid melts at 121–123°.

11'. 7-*chloro*-5-methyl-10,11-dihydro-5H-dibenz[b,f]azepine-2-acetic acid, m.p. 175°–187° (from ethyl acetate/petroleum ether) is obtained analogously, starting with 10 g. of 7-chloro-5-methyl10,11-dihydro-5H-dibenz[b,f]azepine-2-acetonitrile, m.p. 117°–119°.

EXAMPLE 12

5-methyl-10,11-dihydro-5H-dibenz[b,f]azepine-3-acetic acid

A mixture of 13 g. of 5-methyl-10,11-dihydro-5H-dibenz[b,f]azepine-3-acetonitrile, 15 g. of potassium hydroxide and 250 ml. of absolute ethylene glycol is refluxed for 4½ hours. The reaction mixture is poured on to 1,200 ml. of water and extracted with ether. The aqueous-alkaline phase is made acid with 5N hydrochloric acid and extracted with ether. After evaporation of the solvent, the residue is recrystallized from cyclohexane. The obtained 5-methyl-10,11-dihydro-5H-dibenz[b,f]azepine-3-acetic acid melts at 140–141°.

EXAMPLE 13

α-ethyl-5-methyl-10,11-dihydro-5H-dibenz[b,f]azepine-2-acetic acid

A solution of 14.8 g. of 5-methyl-10,11-dihydro-5H-dibenz[b,f]azepine-2-acetic acid ethyl ester in 50 ml. of hexamethyl phosphoric acid triamide is added at 40° under nitrogen to a suspension of 2.5 g. of sodium hydride/mineral oil (1:1) in 80 ml. of hexamethyl phosphoric acid triamide. The mixture is stirred for 45 minutes at 50° and cooled to 30°, whereupon 7.8 g. of ethyl iodide are added dropwise. The mixture is then stirred for 10 hours at 60°, cooled and is poured onto 1,000 ml. of ice water. The mixture is extracted four times with 300 ml. of ether each time. The ether extracts are washed with water, dried over sodium sulfate and concentrated by evaporation under 11 Torr. The residue which, as starting material for the actual saponification, contains the α-ethyl-5-methyl-10,11-dihydro-5H-dibenz[b,f]azepine-2-acetic acid ethyl ester, is dissolved in 300 ml. of ethanol and 100 ml. of 2N sodium hydroxide solution. The solution is refluxed for 3 hours and concentrated to dryness under 11 Torr. The residue is dissolved in 500 ml. of water, the aqueous solution is extracted with 100 ml. of ether, separated and acidified with 2N hydrochloric acid. The precipitated oil is extracted with ethyl acetate. The ethyl acetate solution is washed with water, dried over magnesium sulfate and is concentrated to dryness under 11 Torr. The residue, an oil, is chromatographed on 30 g. of silica gel. The fractions, 4–6, eluted with benzene/ethyl acetate (2:1), are combined and concentrated by evaporation to dryness under 11 Torr. The residue is crystallized from ether/petroleum ether. The α-ethyl-5-methyl-10,11-dihydro-5H-dibenz[b,f]azepine-2-acetic acid melts at 108°–113°.

The starting material for the above given example is produced as follows:

a. 5-methyl-10,11-dihydro-5H-dibenz[b,f]azepine-2-acetic acid ethyl ester

A solution consisting of 32 g. of 5-methyl-10,11-dihydro-5 H-dibenz[b,f]azepine-2-acetic acid in 120 ml. of 1N sodium hydroxide solution is concentrated by evaporation to dryness under 11 Torr. at 50°. The residue is mixed with 100 ml. of absolute benzene and the solution is again concentrated by evaporation to dryness under 11 Torr. at 50°. The residue is dissolved in 350 ml. of absolute dimethyl formamide. The solution is mixed at 40° with 18.5 g. of diethyl sulfate. After 15 minutes, a further 5 g. of diethyl sulfate are added, the mixture is stirred for 30 minutes at 40° and is then poured onto ice water. The precipitated oil is extracted with ether. The ether solution is extracted with 1N sodium carbonate solution and then with water, is separated, dried over magnesium sulfate and concentrated under 11 Torr. at 40°. The residue is distilled in high vacuum. The 5-methyl-10,11-dihydro-5 H-dibenz[b,f]azepine-2-acetic acid ethyl ester boils at 170°/0.001 Torr.

EXAMPLE 14

10,11-dihydro-5H-dibenz[b,f]azepine-3-acetic acid 8.8 g. of 5-acetyl-10,11-dihydro-5H-dibenz[b,f]azepine-3-acetic acid are refluxed with 8 g. of potassium hydroxide in 120 ml. of ethylene glycol for 8 hours under nitrogen. After cooling, the mixture is mixed with water, acidified with 2N hydrochloric acid and extracted with ethyl acetate. The organic phase is concentrated by evaporation and the crystals remaining behind are recrystallized from benzene, whereby the 10,11-dihydro-5H-dibenz[b,f]azepine-3-acetic acid, m.p. 133°–135°, is obtained.

14'.
The 10,11-dihydro-5H-dibenz[b,f]azepine-3-acetic acid, m.p. 133°–135°, is also obtained analogously, starting with 5-butyryl-10,11-dihydro-5H-dibenz[b,f]azepine-3-acetic acid (colorless oil). 14''. The 7-chloro-10,11-dihydro-5H-dibenz[b,f]azepine-3-acetic acid, m.p. 155°–157° (from benzene), is obtained analogously, starting with 4.5 g. of 7-chloro-5-acetyl-10,11-dihydro-5H-dibenz[b,f]azepine-3-acetic acid, m.p. 128°–129°.

14'''. α-methyl-10,11-dihydro-5H-dibenz[b,f]azepine-3-acetic acid, m.p. 129°–131°, is obtained analogously, starting with 2.0 g. of α-methyl-5-acetyl-10,11-dihydro-5H-dibenz[b,f]azepine-3-acetic acid, m.p. 153°–154°.

The starting materials for the above process can be produced as follows:

a. 5-acetyl-10,11-dihydro-5H-dibenz[b,f]azepine-3-carboxylic acid 83.5 g. of 3,5-diacetyl-10,11-dihydro-5H-dibenz[b,f]azepine [cf. Helv. Chim. Acta 44, 753–762, especially 761 (1961)]are dissolved in 750 ml. of dioxane and, while stirring, 375 ml. of 17.8 percent aqueous sodium hypochlorite solution are added dropwise at 0° within 30 minutes. The reaction mixture is stirred first for 30 minutes at 0° and then for 2 hours at room temperature, whereupon the dioxane is evaporated off under vacuum. The aqueous phase remaining behind is washed with ether and then acidified with concentrated hydrochloric acid. The precipitated resin is taken up in sodium hydrogen carbonate solution, the solution is filtered and acidified with dilute hydrochloric acid. The precipitated crystals are filtered under suction, dried and recrystallized from acetone. The thus-obtained 5-acetyl-10,11-dihydro-5H-dibenz[b,f]azepine-3-carboxylic acid melts at 197°–198°.

The following is obtained analogously:

a'. 5-acetyl-7-chloro-10,11-dihydro-5H-dibenz[b,f]azepine-3-carboxylic acid, m.p. 264°–266° (from ether/petroleum ether) is obtained, starting with 62.7 g. of 3,5-diacetyl-7-chloro-10,11-dihydro-5H-dibenz[b,f]azepine.

b. 5-acetyl-α-methyl-10,11-dihydro-5H-dibenz[b,f]azepine-3-methanol

A suspension of 56.0 g. of 3,5-diacetyl-10,11-dihydro-5H-dibenz[b,f]azepine in 300 ml. of absolute methanol is mixed with 10 g. of sodium boron hydride at 5°–10° within 1 hour. The mixture is mixed for 2 hours in the ice bath and for 2 hours at 20°–25°, is poured onto ice cold 2N hydrochloric acid and extracted with ethyl acetate. The 5-acetyl-α-methyl-10,11-dihydro-5H-dibenz[b,f]azepine-3-methanol is obtained as colorless oil.

b'. The 5-formyl-α-methyl-10,11-dihydro-5H-dibenz[b,f]azepine-3-methanol (3-(1-hydroxyethyl)-10,11-dihydro-5H-dibenz[b,f]azepine-5-carboxaldehyde) is analogously obtained as hygroscopic crystals, m.p. 111°–113°.

c. 3-(1-bromoethyl)-5-acetyl-10,11-dihydro-5H-dibenz[b,f]azepine 15 g. of the above reduction product are dissolved in 150 ml. of chloroform and mixed, while cooling with ice, with 35 ml. of phosphorous tribromide in 50 ml. of chloroform within 40 minutes at 0°–5°. The mixture is stirred for 8 hours at 20°–25 and then poured onto ice water. The 3-(1-bromoethyl)-5-acetyl-10,11-dihydro-5H-dibenz[b,f]azepine is obtained as colorless oil after extraction of the mixture with chloroform and washing of the organic phase with 2N sodium hydrogen carbonate solution.

d. 5-acetyl-α-methyl-10,11-dihydro-5H-dibenz[b,f]azepine-3-acetonitrile 10 g. of the above bromocompound are stirred under nitrogen with 5 g. of potassium cyanide in 100 ml. of dimethyl sulfoxide for 4 hours at 40°–50°. The reaction mixture is then poured onto water and extracted with ether. The organic phase is concentrated by evaporation, whereby the 5-acetyl-α-methyl-10,11-dihydro-5H-dibenz[b,f]azepine-3-acetonitrile remains behind as colorless oil and, in a known manner, it is then hydrolyzed to give 5-acetyl-α-methyl-10,11-dihydro-5H-dibenz[b,f]azepine-3-acetic acid.

e. 5-acetyl-10,11-dihydro-5H-dibenz[b,f]azepine-3-carboxylic acid methyl ester 162.0 g. of 5-acetyl-10,11-dihydro-5H-dibenz[b,f]azepine-3-carboxylic acid are refluxed with 6.0 g. of p-toluene sulfonic acid in 1,500 ml. of methanol for 14 hours. After evaporating off the methanol, the residue is taken up in ethyl acetate and is extracted three times with 2N sodium carbonate solution. The organic phase is concentrated by evaporation and the 5-acetyl-10,11-dihydro-5H-dibenz[b,f]azepine-3-carboxylic acid methyl ester, m.p. 122°–124°, is thus obtained.

e'. Analogously 5-acetyl-7-chloro-10,11-dihydro-5H-dibenz[b,f]azepine-3-carboxylic acid methyl ester, m.p. 130°–132° (from methanol) is obtained, starting with 18.5 g. of 5-acetyl-7-chloro-10,11-dihydro-5H-dibenz[b,f]azepine-3-carboxylic acid, m.p. 264°–266°.

f. 5-acetyl-10,11-dihydro-5H-dibenz[b,f]azepine-3-methanol 40 g. of the above methyl ester (cf.e) in 400 ml. of freshly distilled absolute tetrahydrofuran are mixed, in portions, with a suspension of 10.4 g. of lithium aluminum hydride in 100 ml. of absolute tetrahydrofuran at −70° within 30 minutes. The mixture is stirred for 2 hours at −70° and then mixed at −50° to −70° with 10 ml. of ethyl acetate and, following this, with 50 ml. of saturated ammonium chloride solution. The mixture is heated at 10°–20° and extracted with ethyl acetate. The organic phase is washed with 2N sodium carbonate solution, dried and concentrated by evaporation. The residue of crude 5-acetyl-10,11-dihydro-5H-dibenz[b,f]azepine-3-methanol is recrystallized from benzene, m.p. 118°–120°.

f'. Analogously 5-acetyl-7-chloro-10,11-dihydro-5H-dibenz[b,f]azepine-3-methanol is obtained, starting with 11.4 g. of 5-acetyl-7-chloro-10,11-dihydro-5H-dibenz[b,f]azepine-3-carboxylic acid methyl ester, m.p. 130°–132°.

g. 3-bromomethyl-5-acetyl-10,11-dihydro-5H-dibenz[b,f]azepine 30 g. of the above reduction product are dissolved in 300 ml. of chloroform and mixed, while cooling with ice, at 0°–5° with 70 ml. of phosphorus tribromide in 100 ml. of chloroform within 40 minutes. The mixture is stirred for 8 hours at 20°–25° and is then poured onto ice water. The 3-bromomethyl-5-acetyl-10,11-dihydro-5H-dibenz[b,f]azepine is obtained as white crystals, m.p. 106°–107° (from ether) after extraction of the mixture with chloroform and washing of the organic phase with 2N sodium hydrogen carbonate solution.

g'. Analogously is obtained 5-acetyl-7-chloro-3-bromomethyl-10,11-dihydro-5H-dibenz[b,f]azepine with 9 g. 5-acetyl-7-chloro-10,11-dihydro-5H-dibenz[b,f]azepine-3-methanol.

h. 5-acetyl-10,11-dihydro-5H-dibenz[b,f]azepine-3-acetonitrile 20 g. of the above bromine compound are stirred under nitrogen with 10 g. of potassium cyanide in 200 ml. of dimethyl sulfoxide for 4 hours at 40°–50°. The reaction mixture is then poured onto water and extracted with ether. The organic phase is concentrated by evaporation, whereby the 5-acetyl-10,11-dihydro-5H-dibenz[b,f]azepine-3-acetonitrile remains behind as white crystals, m.p. 97°–100° (from benzene/petroleum ether).

h'. Analogously 5-acetyl-7-chloro-10,11-dihydro-5H-dibenz[b,f]azepine-3-acetonitrile, m.p. 112°–114° (from benzene/petroleum ether) is obtained, starting with 8 g. of 3-bromomethyl-5-acetyl-7-chloro-10,11-dihydro[b,f]azepine.

i. 5-acetyl-10,11-dihydro-5H-dibenz[b,f]azepine-3-acetic acid 13.8 g. of 5-acetyl-10,11-dihydro-5H-dibenz[b,f]azepine-3-acetonitrile are dissolved in 60 ml. of absolute ethanol and 300 ml. of chloroform. The solution is saturated at 0°–10° with hydrogen chloride and and is stirred for 8 hours at 20°–25°. After evaporating off the solvent, the residue is taken up in 120 ml. of dioxane and 20 ml. of water and is stirred for 3 hours at 40°. The solution is then concentrated by evaporation and the residue divided between ethyl acetate and 2N sodium hydrogen carbonate solution. The organic phase is dried and concentrated by evaporation. The obtained oily ethyl ester is stirred with 100 ml. of ethanol and 30 ml. of 2N sodium hydroxide solution for 16 hours at 20°–25°. After evaporating off the ethanol, the basic suspension is washed twice with ether and is made acidic with 2N hydrochloric acid. The pale crystals are filtered by suction and recrystallized from ethyl acetate/petroleum ether, whereby the 5-acetyl-10,11-dihydro-5H-dibenz[b,f]azepine-3-acetic acid, m.p. 163°–165°, is obtained.

i'. 5-acetyl-7-chloro-10,11-dihydro-5H-dibenz[b,f]azephine-3-acetic acid, m.p. 128°–129° (from benzene) is obtained analogously, starting with 6.9 g. of 5-acetyl-7-chloro-10,11-dihydro-5H-dibenz[b,f]azepine-3-acetonitrile, m.p. 112°–114°.

EXAMPLE 15

10,11-dihydro-5H-dibenz[b,f]azepine-2-acetic acid 1.37 g. of 5-benzyl-10,11-dihydro-5H-dibenz[b,f]azepine-2-acetic acid are dissolved in 40 ml. of absolute methanol and, after addition of 0.25 g. of palladium charcoal (catalyst 10 percent Pd), hydrogenated at room temperature and under normal pressure. The hydrogenation is finished after 15 minutes. The mixture is filtered and the filtrate concentrated by evaporation under 11 Torr. at 40°. The residue is crystallized from ether/petroleum ether. The 10,11-dihydro-5H-dibenz[b,f]azepine-2-acetic acid melts at 155°–158°.

The starting material for the above example produced as follows:

a. 5-benzyl-10,11-dihydro-5H-dibenz[b,f]azepine-2-acetic acid 4 g. of 5-benzyl-10,11-dihydro-5H-dibenz[b,f]azepine-2-acetonitrile, m.p. 96°–98°, are refluxed with 6 g. of potassium hydroxide in 40 ml. of butanol for 7 hours. The solution is cooled and then concentrated under 0.1 Torr. at 60°–70°, whereby the residue is dissolved in water. The aqueous-alkaline solution is extracted with ether, separated and acidified with 2N hydrochloric acid. The precipitated oil is extracted with ether. The ethereal solution is washed with water, dried over magnesium sulfate and concentrated by evaporation. The residue, a yellow oil, crystallizes from ether. The 5-benzyl-10,11-dihydro-5H-dibenz[b,f]azepine-2-acetic acid melts at 138°–139°.

EXAMPLE 16

5-methyl-10,11-dihydro-5H-dibenz[b,f]azepine-3-acetic acid 7.0 g. of 10,11-dihydro-5H-dibenz[b,f]azepine-3-acetic acid are heated with 14 ml. of methyl iodide and 70 ml. of chloroform in a closed tube at 100° for 24 hours. The brown reaction solution is decolorized with sodium thiosulfate solution and concentrated by evaporation. After recrystallizing from cyclohexane, the obtained 5-methyl-10,11-dihydro-5H-dibenz[b,f]azepine-3-acetic acid melts at 140°–141°.

EXAMPLE 17

5-methyl-10,11-dihydro-5H-dibenz[b,f]azepine-3-acetic acid 14.0 g. of 10,11-dihydro-5H-dibenz[b,f]azepine-3-acetic acid are heated with 70 ml. of methanol and 28 ml. of methyl iodide in a closed tube at 100° for 24 hours. The brown solution is concentrated by evaporation and the residue is dissolved in methylene chloride. The solution is decolorized with sodium thiosulfate solution and then extracted with 2N sodium carbonate solution. The aqueous alkaline phase is acidified with 2N hydrochloric acid and the 5-methyl-10,11-dihydro-5H-dibenz[b,f]azepine-3-acetic acid precipitates. The organic phase is concentrated by evaporation and the 5-methyl-10,11-dihydro-5H-dibenz[b,f]azepine-3-acetic acid methyl ester, which is obtained as residue, is boiled with 200 ml. of ethanol and 40 ml. of 2N sodium hydroxide solution for 15 minutes. After concentrating the solution by evaporation and acidifying the residue, the principal amount of 5-methyl-10,11-dihydro-5H-dibenz[b,f]azepine-3-acetic acid is obtained, m.p. 140°–141°, after recrystallization from cyclohexane.

EXAMPLE 18

7-chloro-5-methyl-10,11-dihydro-5H-dibenz[b,f]azepine-3-acetic acid 16.0 g. of 7-chloro-10,11-dihydro-5H-dibenz[b,f]azepine-3-acetic acid are heated with 70 ml. of methanol and 28 ml. of methyl iodide at 100° in a closed tube for 24 hours. The brown solution is concentrated by evaporation and the residue is dissolved in methylene chloride. The solution is decolorized with sodium thiosulfate solution and then extracted with 2N sodium carbonate solution. The aqueous, alkaline phase is acidified with 2N hydrochloric acid, whereby 7-chloro-5-methyl-10,11-dihydro-5H-dibenz[b,f]azepine-3-acetic acid precipitates. The organic phase is concentrated by evaporation and the 7-chloro-5-methyl-10,11-dihydro-5H-dibenz[b,f]azepine-3-acetic acid methyl ester obtained as residue is cleared of impurities by being added to a mixture of 80 ml. of acetic anhydride and 40 ml. of formic acid, which has been previously stirred for 1 hour at 40°, and stirred for 8 hours at 20°–25. Two hours after the addition of 100 ml. of water, the mixture is extracted with ethyl acetate, washed with 2N sodium carbonate solution and concentrated by evaporation. The residue is chromatographed on 30 times the amount of silica gel. The 7-chloro-5-methyl-10,11-dihydro-5H-dibenz[b,f]azepine-3-acetic acid methyl ester is eluted with benzene and boiled with 200 ml. of ethanol and 40 ml. of 2N sodium hydroxide solution for 15 minutes. After concentrating the solution by evaporation and acidifying the residue, the principal amount of 7-chloro-5-methyl-10,11-dihydro-5H-dibenz[b,f]azepine-3-acetic acid is obtained, m.p. 156°–158° (from ether/petroleum ether).

EXAMPLE 19

α,5-dimethyl-10,11-dihydro-5H-dibenz[b,f]azepine-2-acetic acid

A mixture of 5.5 g. of methyl-(5-methyl-10,11-dihydro-5H-dibenz[b,f]azepine-2)-malonic acid diethyl ester, 3.5 g. of potassium hydroxide, 12 ml. of water and 40 ml. of n-butanol is refluxed for 4 hours to boiling. The mixture is then concentrated to dryness under 11 Torr. and the residue is dissolved in 500 ml. of water. The aqueous solution is extracted with ether, separated and acidified with 2N hydrochloric acid. The precipitated oil is extracted with ether. The ether solution is washed with water, dried over magnesium sulfate and concentrated by evaporation under 11 Torr. The residue is crystallized twice from ethyl acetate, whereby the α,5-dimethyl-10,11-dihydro-5H-dibenz[b,f]azepine-2-acetic acid, m.p. 153°–157° is obtained.

19'. α,5-dimethyl-10,11-dihydro-5H-dibenz[b,f]azepine-2-acetic acid, m.p. 108°–113° (from ether/petroleum ether) is obtained analogously, starting with 10 g. of ethyl-(5-methyl-10,11-dihydro-5H-dibenz[b,f]azepine-2)-malonic acid diethyl ester (oil).

The starting materials are produced as follows:

a. 5-methyl-10,11-dihydro-5H-dibenz[b,f]azepine-2-malonic acid diethyl ester

A mixture of 11.8 g. of 5-methyl-10,11-dihydro-5H-dibenz[b,f]azepine-2-acetic acid ethyl ester (see example 13) and 37 ml. of diethyl carbonate is heated at 80°. A solution of 1.32 g. of sodium in 60 ml. of absolute ethanol is added dropwise at 80°. The ethanol is then distilled off from the reaction mixture. The bath temperature is then slowly increased to 220° and a further 30 ml. of diethyl carbonate are added. 20 ml. of diethyl carbonate are distilled off during about one-half hour. The contents of the flask are cooled and neutralized with a mixture of 6.4 ml. of glacial acetic acid and 110 ml. of ice water. The mixture is extracted twice, each time with 100 ml. of ether, and the ether solution is washed with 1N potassium bicarbonate solution and water, dried over sodium sulfate and concentrated under 11 Torr. The residue, a yellow oil, is distilled in high vacuum. The 5-methyl-10,11-dihydro-5H-dibenz[b,f]azepine-2-malonic acid diethyl ester boils at 190°–195°/0.001 Torr.

b. Methyl-(5-methyl-10,11-dihydro-5H-dibenz[b,f]azepine-2)-malonic acid diethyl ester 0.5 g. of sodium are dissolved in 80 ml. of absolute ethanol. The solution is heated at 50° and is mixed with a solution of 5.9 g. of 5-methyl-10,11-dihydro-5H-dibenz[b,f]azepine-2-malonic acid diethyl ester in 15 ml. of absolute ethanol. The mixture is stirred for one-half hour at 50° and then 3.5 g. of methyl iodide are quickly added dropwise. The reaction mixture is then refluxed, while stirring, for 4 hours and is again mixed with 3.5 g. of methyl iodide. After refluxing for a further 2 hours, the reaction mixture is concentrated by evaporation under 11 Torr. The residue is dissolved in 70 ml. of ether. The ether solution is washed with, in each case, 10 ml. of 10 percent sodium bisulfite solution and water, is dried over sodium sulfate and concentrated by evaporation under 11 Torr. The methyl-(5-methyl-10,11-dihydro-5H-dibenz[b,f]azepine-2)-malonic acid diethyl ester is obtained as yellow oil.

b'. Ethyl-(5-methyl-10,11-dihydro-5H-dibenz[b,f]azepine-2)-malonic acid diethyl ester (oil) is obtained analogously, starting with 6.3 g. of 5-methyl-10,11-dihydro-5H-dibenz[b,f]azepine-2-malonic acid diethyl ester and ethyl iodide.

EXAMPLE 20

5-methyl-10,11-dihydro-5H-dibenz[b,f]azepine-2-acetic acid sodium salt

A solution of 13.4 g. of 5-methyl-10,11-dihydro-5H-dibenz[b,f]azepine-2-acetic acid in 50 ml. of 1N sodium hydroxide solution is concentrated by evaporation to dryness at 50° under 11 Torr. The residue, a yellow oil, is crystallized from ethyl acetate. The 5-methyl-10,11-dihydro-5H-dibenz[b,f]azepine-2-acetic acid sodium salt melts at 192°–194°.

The following prescriptions describe in more detail the production of tablets and dragees:

EXAMPLE 21

1,000 g. of active substance are mixed with 550.0 g. of lactose and 292.0 g. of potato starch. The mixture is moistened with an alcoholic solution of 8.0 g. of gelatine and is granulated through a sieve. After drying, 60.0 g. of potato starch, 60.0 g. of talcum, 10.0 g. of magnesium stearate and 20.0 g. of colloidal silicon dioxide are mixed in. The mixture is then compressed into 10,000 tablets each weighing 200 mg. and each containing 100 mg. of active substance. Optionally, the tablets can be provided with grooves for more accurate adjustment of the dosage amount.

EXAMPLE 22

200.0 g. of active substance are well mixed with 16 g. of maize starch and 6.0 g. of colloidal silicon dioxide. The mixture is moistened with a solution of 2.0 g. of stearic acid, 6.0 g. of ethyl cellulose and 6.0 g. of stearin in ca. 70 ml. of isopropyl alcohol and is then granulated through a sieve III (Ph. Helv. V). The granulate is dried for ca. 14 hours and then put through sieve III–IIIa. The granulate is then mixed with 16.0 g. of maize starch, 16.0 g. of talcum and 2.0 g. of magnesium stearate and the mixture is compressed into 1,000 dragée cores. These are coated with a concentrated syrup made from 2,000 g. of lacca, 7,500 g. of gum arabic, 0.150 g. of dyestuff, 2,000 g. of highly dispersed silicon dioxide, 25,000 g. of talcum and 53,350 g. of sugar, and dried. The obtained dragées each weigh 360 mg. and each contain 200 mg. of active substance.

What is claimed is:

1. A compound of the formula

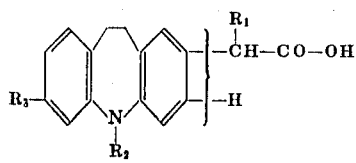

wherein
the group

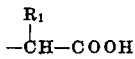

is in 2- or 3-position,
$R_1$ is hydrogen or lower alkyl having at most three carbon atoms,
$R_2$ is hydrogen or lower alkyl having at most four carbon atoms, and
$R_3$ is hydrogen or chloro,
and the pharmaceutically acceptable salts thereof with a base.

2. A compound according to claim 1, wherein the group

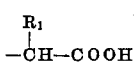

is in 2- or 3-position, $R_1$ is hydrogen or methyl, $R_2$ is hydrogen or methyl and $R_3$ is hydrogen or chloro.

3. A compound according to claim 1, wherein the group

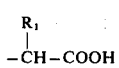

is in 3-position, each of $R_1$ and $R_3$ is hydrogen, and $R_2$ is methyl.

4. A compound according to claim 1, wherein the group

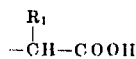

is in 2-position, and each of $R_1$, $R_2$ and $R_3$ is hydrogen.

5. A compound according to claim 1, wherein the group

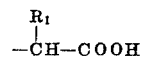

is in 2-position, each of $R_1$ and $R_3$ is hydrogen, and $R_2$ is methyl.

6. A compound according to claim 1, wherein the group

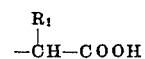

is in 2-position, each of $R_1$ and $R_2$ is methyl, and $R_3$ is hydrogen.

7. A compound according to claim 1, wherein the group

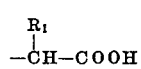

is in 2-position, $R_1$ is hydrogen, $R_2$ is methyl and $R_3$ is chloro.

* * * * *